3,813,221
DRY CLEANING METHOD
Marcella C. Stubits, St. Louis, Mo., assignor to Anheuser-Busch, Incorporated, St. Louis, Mo.
No Drawing. Filed Jan. 24, 1972, Ser. No. 220,451
Int. Cl. D06l 1/22
U.S. Cl. 8—142
2 Claims

ABSTRACT OF THE DISCLOSURE

This disclosure relates to a method of cleaning rugs, furniture, fabrics, etc., in which granules of carbohydrate fatty acid esters, preferably cellulose laurate, are treated with a hydrocarbon solvent cleaning fluid, applied to the article to be cleaned so that the solvent from the granules loosens and dissolves the stain which is picked up by the granules (which also re-absorb the solvent) and both the stain and solvent are removed from the article with the granules.

REFERENCE TO OTHER APPLICATIONS

This application contains subject matter in common with applications filed of even date herewith as follows: Application of Teng et al. entitled Lipophilic Cellulose Sponges; application of Stubits entitled Method of Absorbing Fats and Oils; application of Teng et al. entitled Method of Removing Oil Spills; and previously filed pending applications of Teng et al. Ser. No. 845,067, filed July 25, 1969; Ser. No. 154,219, filed June 17, 1971; Ser. No. 106,882, filed Jan. 15, 1971; and Ser. No. 44,640, filed June 8, 1970.

BACKGROUND OF THE INVENTION

Carbohydrate fatty acid ester particles will absorb many times their weight in aliphatic, aromatic, heterocyclic and halogenated hydrocarbons. The carbohydrate esters therefore are able to serve as carriers for non-polar solvents.

I have discovered that a carbohydrate fatty acid ester compound used as a solvent carrier is useful for removing grease stains from textile materials.

When the solvent saturated powder is pressed into the fiber pile of the soiled fabric, it has the action of numerous tiny sponges, releasing solvent under pressure and re-absorbing the solvent plus the dissolved grease. After the solvent has evaporated, the soiled dry powder is easily vacuumed from the fiber surface.

SUMMARY OF THE INVENTION

This invention comprises a method of cleaning textiles using granules of carbohydrate fatty acid esters having a hydrocarbon solvent absorbed thereon. The solvent laden granules are rubbed into the stain to be removed so that the solvent is released to remove the stain. The granules pick up the stain as they reabsorb the solvent.

DETAILED DESCRIPTION

Prior applications Ser. Nos. 845,067; 106,882 and 154,219 show methods of preparing carbohydrate fatty acid esters. Specifically, these applications show the preparation of starch laurates and cellulose laurates and the disclosures of such applications are incorporated herein and made a part of this application.

Carbohydrate fatty acid esters having a degree of substitution (D.S.) of about 0.5 to about 2.7 are useful in this invention. The degree of substitution is based on a theoretical of 3 and measures the substitution of the theoretically available hydroxyl functions per monosaccharide unit with lipophilic groups. The degree of substitution determines the solvent carrying capacity of the granule. Above a certain level, the more highly substituted the granule, the less solvent it can absorb.

The fatty acid derivative can have a chain length of C-8 to C-18 and can be saturated or unsaturated.

The carbohydrate-fatty acid ester granules can have absorbed therein from about 5 to about 10 times by weight of solvent based on their own weight.

The suitable solvents or cleaners include aliphatic, aromatic, heterocyclic, and halogenated hydrocarbons. Typical of these are the following: Stoddard solvent, benzene, tetrahydrofuran, and carbon tetrachloride.

The granules can be from 10 to 100 mesh (U.S. Standard) in size, and have a specific gravity of about 1.0 to 1.5. The solvent laden granules can be applied for 5 to 15 minutes to a textile to be cleaned and left to dry for 10 to 30 minutes. The temperature of the cleaning can be from 50 to 80° F.

About 100 to about 800 grams solvent saturated carbohydrate fatty acid ester is applied to each sq. ft. of surface to be cleaned.

Materials to be cleaned can be any conventional natural or synthetic textile such as wool, nylon, acrylic, etc. Following are specific examples of this invention:

EXAMPLE NO. I

A. Preparation of three ply looped wool carpets for the test (1) 1 gram of carbon soot and 15 grams of beef fat (1:15 ratio) are mixed and worked into the carpet in spots of 1 inch diameter. 1 gram of the mix is worked into each spot.
(2) Crude oil is dropped onto the carpet to produce spots of ½ inch diameter. 0.5 gram of crude oil is deposited into each spot. The carpet is placed on a non-absorbent surface for stain removal.

B. Stain Removal (1) Control.—Each spot is rubbed with a square cotton cloth saturated with perchloroethylene. 5 ml. of solvent are applied to each square inch of surface to be cleaned. The stains have a tendency to smear and spread into larger circles. Repeated scrubbing fails to remove either the beef fat or crude oil stain completely. The addition of more solvent flushes the stain deeper into the carpet and through to the jute back.

(2) Test procedure for cellulose laurate.—Cellulose laurate powder having a D.S. of 1.6 and of 80 mesh particle size is saturated with perchloroethylene (1:10 ratio by weight). The solvent saturated cellulose laurate is pressed into the stained carpet pile, at a rate of 5 grams per square inch of surface to be cleaned. The grease dissolves in the solvent, and quickly is absorbed by the cellulose laurate. The stain shows no tendency to spread. After 5 minutes, the dry cellulose laurate powder is brushed from the carpet. There is no trace of stain from either the carbon-fat mixture, or the crude oil. The dissolved grease is sucked up from the surface of the carpet, rather than being flushed through to the back. The fibers appear to be restored to their original condition, and there is no trace of matting or stickiness from the cellulose laurate treatment.

EXAMPLES NOS. II AND III

The foregoing, when repeated with cellulose laurate of D.S. 1.0 and 2.0, worked equally well.

EXAMPLE NO. IV

Ten grams of cellulose laurate (D.S. 0.8) is saturated with carbon tetrachloride in a 1:5 ratio by weight. The moist powder is brushed into the headrest of a nylon velvet chair, which had become stained by hair oil. The head rest has 72 square inches of surface to be cleaned. After 15 minutes, the dry powder is vacuumed from the fabric. No trace of stain or damage by the solvent treated cellulose laurate, is noticed.

EXAMPLE NO. V

Five grams of cellulose laurate (D.S. 2.7) is saturated with Stoddard solvent. This is a solvent of paraffin base. The final cleaning aid weighs 25 grams. This material is brushed into the pile of a white Orlon synthetic fur coat which had been stained by black axle grease. The coat has about 4 square inches of surface of be cleaned. The soiled cellulose laurate is brushed out after 15 minutes, leaving no trace of stain or matting.

What is claimed is:

1. A method of cleaning textiles wherein up to 10 parts by weight hydrocarbon base cleaning solvent is absorbed into each part carbohydrate fatty acid ester comprising the steps of A. absorbing a hydrocarbon base cleaning solvent onto a carbohydrate fatty acid ester which is the granule form of about 10 to about 100 mesh (U.S. Standard) and has a specific gravity of about 1 to about 1.5, wherein the carbohydrate is starch or cellulose and the fatty acid ester has a chain length of between about C-8 and about C-18 and a degree of substitution of between about 0.5 and about 2.7,
   B. applying this mixture to the textile surface to be cleaned in an amount of about 100 grams to about 800 grams of mixture per square foot of surface to be cleaned,
   C. releasing the solvent to the textile,
   D. reabsorbing the solvent and attached dirt from the textile, into the carbohydrate fatty acid ester, and
   E. removing the carbohydrate fatty acid ester with attached dirt.

2. The method of claim 1 wherein the carbohydrate fatty acid ester is cellulose laurate.

References Cited

UNITED STATES PATENTS

| | | | |
|---|---|---|---|
| 3,563,693 | 2/1971 | Cohen | 8—142 |
| 2,344,247 | 3/1944 | Hopkins et al. | 8—142 |
| 2,970,962 | 2/1961 | Hass et al. | 252—135 |
| 2,982,676 | 5/1961 | Boer | 8—142 X |
| 2,181,691 | 11/1939 | Bucy | 252—89 DC |
| 3,183,197 | 5/1965 | Richardson et al. | 106—191 X |

MAYER WEINBLATT, Primary Examiner

U.S. Cl. X.R.

106—189, 191, 213; 252—89 DC